Figure 1:
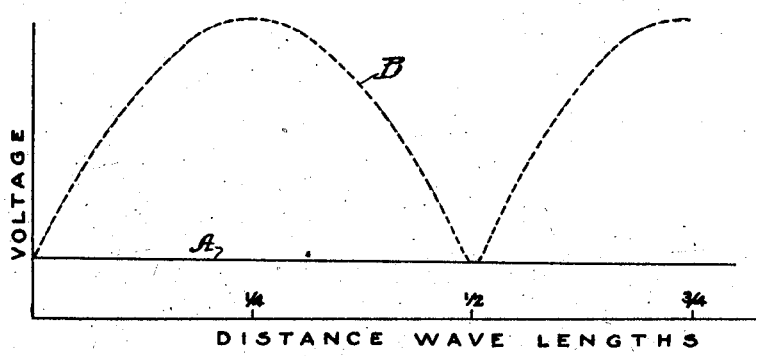

Dec. 9, 1941.   M. FERRIS   2,265,637
HIGH FREQUENCY MEASURING APPARATUS AND METHOD
Filed May 17, 1937   3 Sheets-Sheet 2
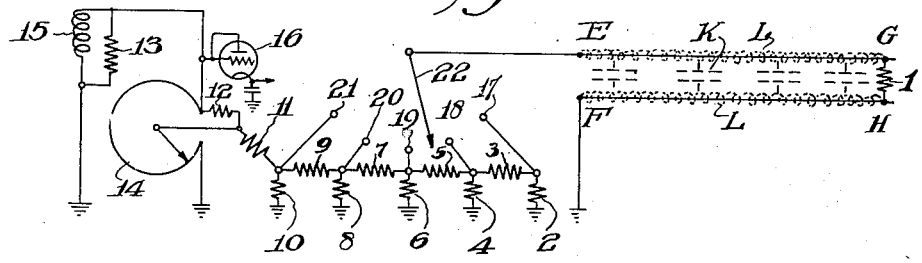
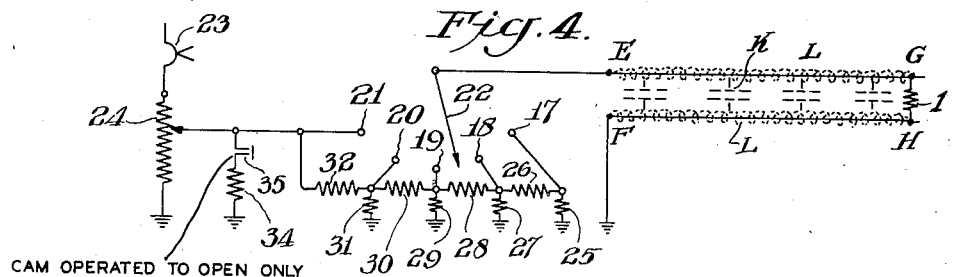
CAM OPERATED TO OPEN ONLY
WHEN 22 ENGAGES 21
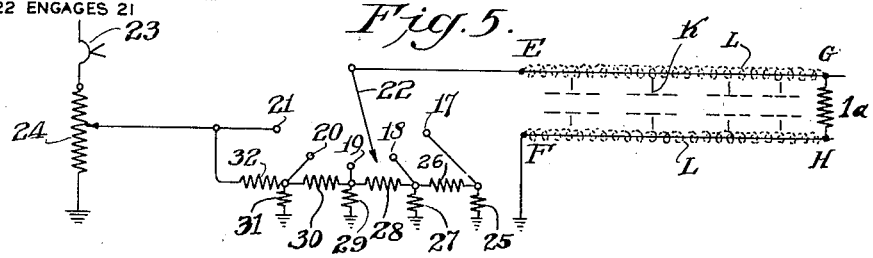
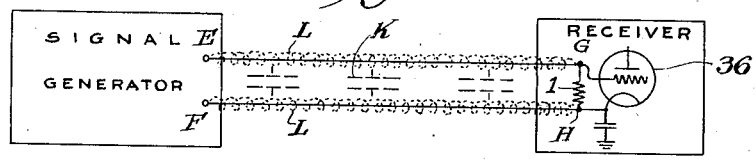
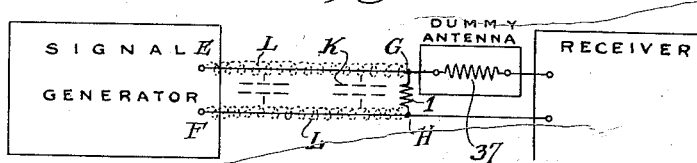
Inventor
Malcolm Ferris
By Thomas Appleby
his Attorney Dec. 9, 1941.                M. FERRIS                2,265,637
              HIGH FREQUENCY MEASURING APPARATUS AND METHOD
                        Filed May 17, 1937         3 Sheets-Sheet 3
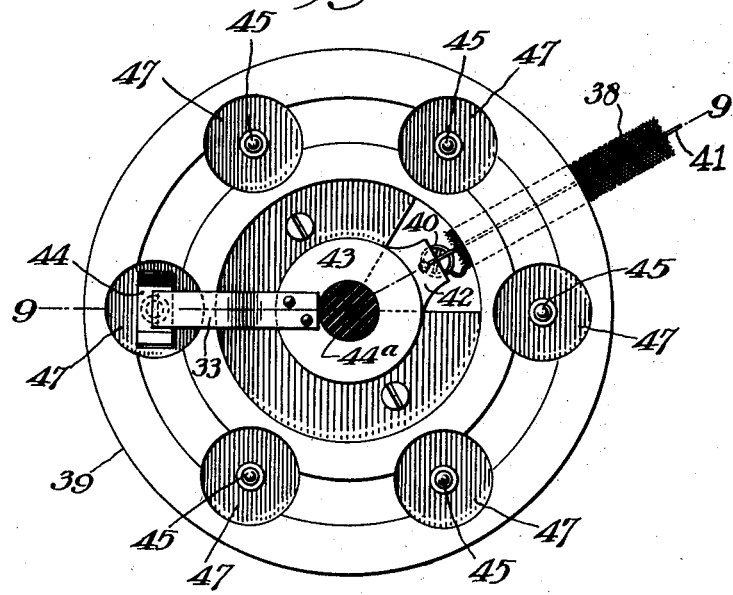
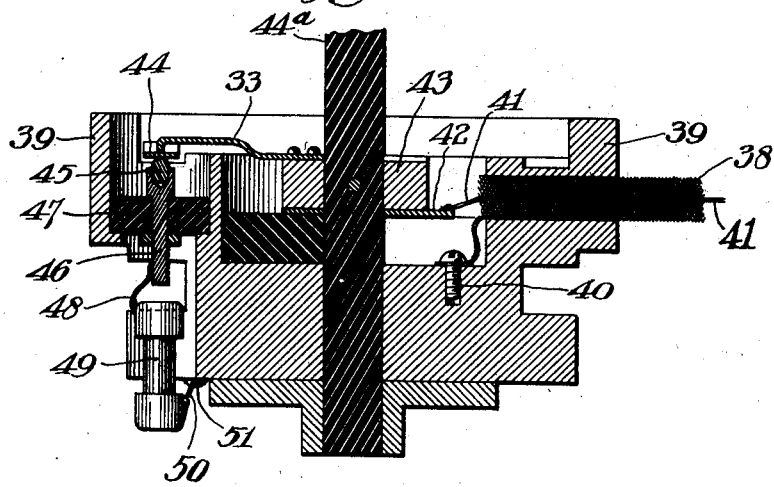
Inventor
Malcolm Ferris
By Thomas Appleby
    his Attorney.

Patented Dec. 9, 1941

2,265,637

UNITED STATES PATENT OFFICE 2,265,637

HIGH FREQUENCY MEASURING APPARATUS AND METHOD

Malcolm Ferris, Boonton, N. J.; Ellen P. Ferris, executrix of said Malcolm Ferris, deceased, assignor to Ferris Instrument Corporation, Boonton, N. J., a corporation of New Jersey Application May 17, 1937, Serial No. 142,950

12 Claims. (Cl. 250—20)

This invention relates to the art of measuring the sensitivity and other characteristics of radio receivers and amplifiers by generating standard signals of predetermined characteristics and introducing them into the receiver or amplifier under test by means of a connecting line or cable.

A particular object of this invention is to provide a means for eliminating errors which have heretofore generally been introduced into such measurements by the wires or cable used to connect the signal generator or other measuring apparatus to the receiver or amplifier under test; and it relates particularly to additions to the arrangement shown in my Patent 1,793,601, granted October 11, 1931, to overcome its unsatisfactory applicability for measurements of devices designed to include the ultra high frequency ranges which have recently been arrived at in extensive and important uses.

Heretofore such errors have been largely due to the fact that the connecting lines or cable used have introduced undesired inductance and capacitance of appreciable magnitude into the circuit. It has been possible to reduce these errors at the lower frequencies by using very short leads and arranging them to avoid undue inductance or capacitance, but this method has not been satisfactory for frequencies above about 20 megacycles per second as even the shortest leads which are practical with conventional types of apparatus cause serious errors. This fact has heretofore prevented satisfactory and reliable measurements in the ultra high frequency region.

My invention relates to methods of eliminating these errors by arranging the leads in the form of a properly terminated transmission line, and I have found that results heretofore considered impossible can be obtained by arranging the leads in such manner that their inductance and capacitance are substantially uniformly distributed throughout their length, and by eliminating lumped reactances at the input and output ends of the line so that it can be terminated in a substantially pure resistance at both ends.

The transmission line, consisting of a line with substantially uniformly distributed inductance and capacitance, is well known in the art, and is frequently used to connect transmitters or receivers with antennas, often over a distance of several wave lengths. It is well known that if a transmission line is terminated in a resistance having a value equal to $\sqrt{L/C}$ ohms (termed the characteristic impedance of the line) where L and C are the inductance and capacitance respectively per unit length of line, the voltage existing at various points along the line will be substantially equal to the voltage at the line input. This particular value of terminating resistance destroys all resonances, no matter what line length or frequency is being considered, whereas if the line is terminated in a higher or lower impedance the voltage along the line will vary greatly reaching maximum or minimum values at points distant by a quarter wave length or multiples thereof.

Figure 2:
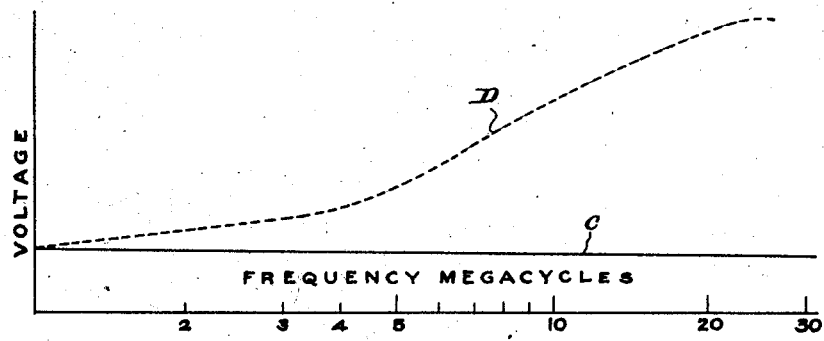

Figs. 1 and 2 illustrate graphically the voltage distribution along various transmission lines of the prior art as compared with the voltage distribution along the transmission line of the invention. Figs. 3 through 7 show various circuit arrangements in accordance with the invention while Figs. 8 and 9 show details of an attenuator structure forming a part of the invention.

In Figure 1 the solid line A indicates the voltage to be expected along a line terminated in its characteristic impedance, while the dotted curve B indicates the voltage along a line which is open circuited, that is, terminated with an infinite impedance.

A line of fixed length is normally used in connecting a signal generator with a receiver or other apparatus to be measured and the only points where the voltage is normally of interest are the input and output. However, the frequency is normally varied over relatively wide limits and conditions with a fixed length of line, with frequency varied, can be expected to show quite similar effects as indicated in Figure 2 where the solid curve C shows conditions for a line terminated with its characteristic impedance, while the dotted curve D shows the conditions for a line open at its outer end. Peaks of output voltage on this dotted curve occur at such frequencies that the line length is an odd multiple of one quarter wave length.

Observations made on previously existing signal generators and connecting wires show effects in general similar to the dotted curve of Figure 2, though often complicated due to the presence of considerable lumped inductance. Tests made with properly terminated transmission lines have shown that results similar to the solid curve of Figure 2 are readily obtainable, and signal generators incorporating such properly terminated transmission lines have been built. These signal generators have made possible reliable measurements at frequencies up to 150 megacycles per second whereas heretofore measurements at frequencies much over 20 or 30 megacycles per second have been subject to such great errors as to be very unreliable and often entirely worthless.

While the use of the properly terminated transmission line practically eliminates the errors previously occurring in the leads, and makes reliable measurements possible at the ultra high frequencies, it imposes certain conditions on the signal generator, and for best results the attenuator of the signal generator must be specially designed to work with such a line.

The properly terminated transmission line, as considered from its input terminals, is a resistor of the same value as its characteristic impedance, and when it is connected to the output terminals of a signal generator it changes the voltage at these terminals. It is therefore necessary either to compute this change, and apply a correction to the results, or to design the attenuator of the signal generator so that the changed voltage (that is, with the line connected) has the desired value.

In most signal generators the output terminals connect through a switch which connects to different point in the attenuator, according to the output voltage desired. If the attenuator is such that connection of the line makes the same difference in output on every point, correction can be made by merely increasing the input voltage to the attenuator by the proper factor, and making certain that the terminated line is always used.

Often other conditions which an attenuator must meet make it impossible to so arrange it that connection of the terminated line will make the same difference on every point, and then more elaborate methods must be used for correction. Three types of correction have been found useful:

(1) Changing the attenuator input.
(2) Changing an attenuator ratio, to alter all voltages beyond a certain point.
(3) Connecting additional resistors to one or more points in the attenuator, preferably by a switch automatically operated by cam or other suitable means from the main attenuator switch, so that the resistors can be connected only during the time the main switch is in certain positions.

As an illustration of the method of correction classed above as (1), there is shown in Figure 3 an attenuator system, comprising resistors 2, 3, 4, 5, 6, 7, 8, 9, 10, 11, 12, 13 and inductive potentiometer 14 associated with an oscillation generating system inductively coupled to inductance 15 and a vacuum tube 16 of a vacuum tube voltmeter system, that has been used in a signal generator designed for operation in the 20 to 100 megacycle range.

The output terminals of this attenuator system are connected to a transmission line E—F, G—H, whose distributed capacity and inductance is indicated by dotted condensers K and dotted turns of inductance L. This particular transmission line had a characteristic impedance of 30 ohms, and the terminating resistor 1 was therefore made 30 ohms.

Other resistors in Figure 3 are 2 which has a value of 30 ohms, 4, 6, and 8 are each 33 ohms, 3, 5, 7, and 9 are each 270 ohms, 10 is 42 ohms, 11 and 13 are each 100 ohms, and 12 is 200 ohms.

As the 30 ohm transmission line E—F, G—H, is properly terminated it resembles, so far as the attenuator system is concerned, a 30 ohm resistor and when the transmission line is connected to any of the attenuator switch points 17, 18, 19, 20 or 21, it therefore reduces the output voltage to .526 of what it would otherwise be, and this is corrected by making the input voltage, as measured by the vacuum tube voltmeter system represented by vacuum tube 16, 1.9 times as great as it would otherwise be.

It is obvious that operation of this attenuator without the transmission line would cause serious errors, therefore the physical construction selected is such that the output transmission line is permanently connected to the attenuator switch lever 22 so that the instrument cannot be used without the transmission line.

As an illustration of the methods of correction classed above as (2) and (3), Figure 4 shows the schematic diagram of an attenuator employing both of these methods. The transmission line used in this case is also a 30 ohm line, and resistor 1 is therefore 30 ohms. The attenuator input, instead of being measured by a vacuum tube voltmeter, is in this case determined by a known current, measured by thermo element 23, passing through a calibrated potentiometer 24 which has a resistance of 5.5 ohms.

In Figure 4, resistors 25 and 31 have each a value of 5.5 ohms, 26, 28 and 30 are each 49.5 ohms, 27 and 29 are each 6.11 ohms, 32 is 35 ohms, and 34 is 30 ohms.

Connection of the 30 ohm transmission line E—F, G—H, across the calibrated potentiometer 24 would of course change its calibration. If the potentiometer was calibrated with the switch lever 22 on point 21 (with the transmission line connected) it would be accurate on this point, but inaccurate on any of the other points 17, 18, 19 and 20. Similarly, if calibrated on points 17, 18, 19 or 20 it would be accurate on these points, but inaccurate on point 21. To remedy this condition a 30 ohm resistor 34 is connected into the circuit by means of switch 35 operated by a cam on the attenuator switch shaft. Switch 35 is closed except when the transmission line is connected to point 21. Therefore there is always a 30 ohm resistor across the potentiometer 24— either the transmission line itself, or resistor 34— and the calibration of potentiometer 24 remains the same for all points 17, 18, 19, 20 and 21 on which switch lever 22 may be placed.

In Figure 4, connection of the 30 ohm transmission line to switch points 17, 18, 19 or 20, reduces the voltage to .8 of the value it would be otherwise. To correct for this, resistor 32 is made 35 ohms instead of the usual 45 ohms, so that this section of the attenuator gives a voltage reduction of 8 times instead of the usual ten times. This raises the voltage on points 17, 18, 19 and 20 by a factor of 1.25 and thus corrects for the reduction in voltage due to connection of the transmission line.

Figure 5 shows the schematic diagram of an attenuator similar to that of Figure 4, except that the resistor 34 and switch 35 (of Fig. 4) are eliminated, and resistor 32 is therefore made the usual value of 45 ohms. The transmission line E—F, G—H, used with this attenuator has a characteristic impedance of 120 ohms, and resistor 1a is therefore made 120 ohms. This transmission line, as considered from the attenuator, appears like a resistance of 120 ohms, and this, connected to any of the attenuator points 17, 18, 19, 20 or 21, will reduce the voltage by not more than four percent. For most purposes this error is so small that it can be neglected and no correction applied. This method, of using a transmission line of sufficiently high impedance so that the correction may be neglected, will probably prove of most value in applying the transmission line principle to signal generators already built, especially those which have a low impedance output.

To obtain the desired action from the transmission line it is necessary that any output load connected to it be sufficiently high in impedance so as to avoid greatly altering the effective termination. The lower the impedance of the transmission line, the lower the value of load that can be used without causing serious error.

Figures 6 and 7 show the two systems of connection most commonly used in making measurements. In Figure 6 the output of the terminated transmission line E—F, G—H, is shown connected directly to the input terminals of a vacuum tube 36 which has a high impedance value and therefore puts only a small load on the transmission line. In Figure 7 the transmission line E—F, G—H, is shown connected through a dummy antenna resistance to the input terminals of a receiver. For many high frequency measurements it is usual to employ a 400 ohm resistor 37 as a dummy antenna, and when this is done the load on the transmission line will be of sufficiently high impedance to be neglected when using a 30 to 50 ohm line, and will not usually cause serious error even when a line as high as 100 or 120 ohms impedance is used.

The terminated transmission line, as considered from the external load, resembles a resistor of its characteristic impedance in parallel with its terminating resistor, provided it is also terminated at its inner end E—F in a resistor equal to its characteristic impedance. Thus the arrangement shown in Figure 3, as considered from the external load, appears to be 15 ohms (that is, a 30 ohm terminating resistor in parallel with a 30 ohm line) since it will be seen that the arrangement is such that it is terminated in approximately 30 ohms in every position of the switch lever 22.

If the transmission line is terminated at its inner end E—F in a value other than its characteristic impedance, the terminated line, as considered from the load, will appear like the terminating resistor in parallel with an impedance of unknown value, which may be largely reactive.

It has already been mentioned that to obtain proper results the inductance and capacitance of the transmission line should be substantially uniformly distributed, and lumped reactances at the input and output ends should be eliminated. To accomplish this it is necessary that the terminating resistor should be as nearly non-inductive as possible; that is, it should be as free from inherent, reactive dephasing characteristics as its physical construction will permit by the best methods so far known in the art. Experience has shown that it is impractical to construct a wire wound resistor of sufficiently low inductance, and the best results have been obtained with a resistor of filamentary type.

Eliminating lumped inductance at the input end of the transmission line requires special construction of the associated parts if best results are desired.

Figure 8 shows a plan view, and Figure 9 a sectional elevation taken on line 9—9 of Figure 8, of an attenuator structure which I have designed to keep the inductance low at the input end of the transmission line. This arrangement has been found to operate very satisfactorily in the 20 to 100 megacycle region, using the attenuator system shown schematically in Figure 3.

In Figures 8 and 9 the 30 ohm transmission line, which is of the concentric cable type, is shown at 38. It passes through an opening in the metal attenuator block or frame 39 and the outer conductor is connected or grounded to the block or frame 39 by means of a screw 40. The inner conductor 41 is connected to the attenuator circuit by means of contact member 42 by soldering or otherwise. Contact member 42 is slidably associated and electrically in contact with metal disc 43 which is pinned to a rotatable shaft 44a of insulating material such as Bakelite. Switch arm 33 is secured to disc 43 and is provided with a contact shoe 44 in slidable engagement with contact point 45. Contact point 45 is mounted in a conducting contact holder 46 securely positioned in an insulator 47. Terminal 48 of resistor 49 is attached by soldering or otherwise to contact holder 46, and its other terminal 50 is secured or grounded to the attenuator block or frame 39 by means of a screw 51.

In Figures 8 and 9 it will be seen that the actual physical length of the necessary connections has been kept to a minimum, and the included area reduced as much as practical, to reduce the lumped inductance to a minimum practical with relatively simple construction.

Where it is desired to use a properly terminated transmission line with an existing signal generator, where there is appreciable lumped inductance in the generator, the frequency at which lumped inductance causes serious error can be extended by using a high impedance line. As long as the reactance of the lumped inductance is less than approximately one fifth the characteristic impedance of the line the error due to it can usually be expected to be small. As mentioned previously, the use of a high impedance line has the disadvantage that it places greater limitations on the load which can be used than does a low impedance line.

While it might be inferred from the schematic diagrams of Figures 3, 4, 5, 6 and 7 that the transmission line used consists of two wires of similar construction it is usually desirable to use a concentric cable with the inner wire forming the conductor designated as E—G in the diagrams and the outer sheath forming conductor F—H.

In Figures 6 and 7 the signal generator, and the chassis or frame of the receiver, connected by conductor F—H, form a resonant system of considerable importance. If the outer sheath of a concentric cable is used for conductor F—H oscillations may be set up in this resonant system which will not be coupled to the receiver input as there will be no field inside the concentric cable. If two ordinary open wires are used for the line such oscillations would be coupled to the receiver input and would in many cases cause erratic results.

It has been mentioned that with a properly terminated transmission line the voltage along the line remains substantially constant. There is actually a small transmission loss which increases with length of line and with frequency, but for the purpose of the present invention this can usually be neglected. If exceptional accuracy is required a compensating network can be introduced between the attenuator and the vacuum tube voltmeter so that the attenuator input would be increased to compensate for the transmission loss. A line exactly like that used on the attenuator output would provide suitable compensation.

The transmission loss can be greatly reduced by using high quality insulation in the line, and keeping the quantity of it at a minimum. This is common practice where transmission lines are used to connect antennas and transmitters, and where the lines are of considerable length. For use in connecting a signal generator with a receiver or other device to be measured, where the line length is likely to be of the order of three feet, this is not necessary, and flexibility and convenience in use are more important than a slight difference in transmission loss.

Transmission lines having values of characteristic impedance of 30 ohms and 120 ohms have been specifically mentioned herein. These have been convenient values, but it is of course possible to apply the same method with lines of different impedance, either higher or lower or intermediate between the two values mentioned.

Many other combinations besides those herein illustrated and described are of course possible, and this description should enable anyone skilled in the art to apply my invention to actual measuring apparatus.

What I consider as new and desire to protect by Letters Patent is covered by the following claims:

1. An arrangement for measuring the performance of a device designed to be operatively responsive to electrical alternating current potentials over an extremely wide range of superaudible frequencies comprising means for creating suitable potential producing alternating currents changeable in frequency to correspond to the frequencies needed for testing including a substantially pure resistance element through which said alternating currents flow, a network of distributed resistances connected across difference of potential points in said resistance having a plurality of differently disposed contacts, a resistance in series with switching means also connected across said difference of potential points, a double conductor cable of minimum permissible length terminated by a cross-connected resistance element as free from dephasing reactive characteristics as its physical construction will permit, and which has an impedance substantially equal to the characteristic impedance of said cable, means for connecting the responsive elements of the device under test across difference of potential points of said last named resistance, a switch-arm successively contactable with all of the contacts of the said network of resistances associated with the end of one conductor of said cable, a connection between the input end of the other conductor of said cable and a common point of potential of said resistance network, and means for maintaining said first named switching means closed except when said switch arm is in contact with a chosen one of the contacts of said network of resistances.

2. An arrangement for measuring the performance of a device designed to be operatively responsive to electrical alternating current potentials over an extremely wide range of superaudible frequencies comprising means for creating suitable potential producing alternating currents changeable in frequency to correspond to the frequencies needed for testing, a double conductor cable of minimum permissible length selected to have minimums of inherent distributed inductance and capacitance between its associated conductors connected as output means for the said alternating current potential producing means terminated by a cross-connected resistance element which is as free from inherent dephasing reactive characteristics as its physical construction will permit, and which has an impedance substantially equal to the characteristic impedance of the said cable, said cable arrangement being entirely free from lumped inductance and capacitance, and means for connecting the responsive elements of a device under test across difference of potential points of the said resistance.

3. An arrangement for measuring the performance of a device designed to be operatively responsive to electrical alternating current potentials over an extremely wide range of superaudible frequencies comprising means for creating suitable potential producing alternating currents changeable in frequency to correspond to the frequencies needed for measuring, a double conductor cable of minimum permissible length selected to have minimums of distributed inherent inductance and capacitance between its associated conductors connected as output means for the said alternating current potential producing means terminated by a cross-connected resistance element which is as free from inherent reactive characteristics as its physical construction will permit, and which has an impedance substantially equal to the characteristic impedance of said cable, and means for connecting the sesponsive elements of a device under measurement across difference of potential points of the said terminating resistance.

4. The arrangement of claim 1 in which the double conductor cable is a concentric cable in which the inner conductor and outer sheath serve as double conductors.

5. The arrangement of claim 2 in which the double conductor cable is a concentric cable in which the inner conductor and outer sheath serve as double conductors.

6. The arrangement of claim 3 in which the double conductor cable is a concentric cable in which the inner conductor and the outer sheath serve as double conductors.

7. The arrangement of claim 2 in which the two conductor cable is connectable as output means for the alternating current potential producing means through a switch arrangement designed to contact with any one of a number of contacts associated with different resistance networks, whereby potentials selected for measuring a device may be differed to a predetermined extent.

8. The arrangement of claim 3 in which the two conductor cable is connectable as output means for the alternating current potential producing means through a switch arranged to contact with any one of a number of contacts associated with different resistance networks, whereby the potentials selected for measuring a device may be differed to a predetermined extent.

9. An arrangement for checking the relative performances at different frequencies of devices designed to be operatively responsive to potentials of electrical alternating currents over an extremely wide range of ultra high frequencies comprising means for generating suitable potential producing electrical alternating currents changeable in frequency to correspond to the frequencies needed for checking, a network of resistances having a plurality of differently disposed contacts associated with the output of said generating means, a double conductor transmission line having its output end terminated by a substantially non-reactive impedance element having an impedance substantially equal to the characteristic impedance of the said line, switching means successively contactable with all of the contacts of the said network of resistances associated with the input end of a conductor of the said line, and a connection between the input end of the other conductor of the said line and a point of common potential of said resistance network, the resistance values of said network being so chosen that the combination resistance across the input end of the said line will substantially equal the characteristic impedance of the said line when the said switching means is in contact with any one of the said plurality of contacts.

10. An arrangement for checking the relative performances at different frequencies of devices designed to be operatively responsive to potentials of electrical alternating currents over an extremely wide range of ultra high frequencies comprising means for generating suitable potential producing electrical alternating currents changeable in frequency to correspond to the frequencies needed for checking, and a double conductor cable of minimum practical length connected as output and transmission means for said generating means having at each of its ends substantially equal non-reactive impedances each substantially equal in value to the characteristic impedance of the said cable.

11. An arrangement for checking the relative performances at different frequencies of devices designed to be operatively responsive to potentials of electrical alternating currents over an extremely wide range of ultra high frequencies comprising means for generating suitable potential producing electrical alternating currents changeable in frequency to correspond to the frequencies needed for checking, and a double conductor cable of minimum practical length as output and transmission means for said generating means terminated at its outer end by a substantially non-reactive impedance substantially equal in value to the characteristic impedance of the said cable, said cable being entirely free, either directly or indirectly, from any lumped inductance or capacitance reaction or reactions.

12. An arrangement for checking the relative performances of devices at different frequencies designed to be operatively responsive to potentials of electrical alternating currents over an extremely wide range of ultra high frequencies comprising means for generating suitable potential producing electrical alternating currents changeable in frequency to correspond to the frequencies needed for checking, a double conductor cable of minimum practical length as output and transmission means for said generating means terminated at its outer end by a substantially non-reactive impedance substantially equal in value to the characteristic impedance of the said cable, and variable impedance means associated with the output of said generating means and the input of said cable for varying the potentials impressed upon the input of the said cable to any one of a plurality of predetermined values, and for maintaining the input impedance to the said cable substantially equal in value to the value of the characteristic impedance of the said cable.

MALCOLM FERRIS